United States Patent [19]

Weber

[11] Patent Number: 5,222,441
[45] Date of Patent: Jun. 29, 1993

[54] FASTENING DEVICE FOR A RAILROAD CAR TRUCK ROCKER SEAT

[76] Inventor: Hans B. Weber, 199 Annapolis La., Rotonda West, Fla. 33947

[21] Appl. No.: 898,703

[22] Filed: Jun. 15, 1992

[51] Int. Cl.$^5$ .............................................. B61F 5/50
[52] U.S. Cl. .................... 105/208; 105/208.2
[58] Field of Search ............ 105/187, 201, 208, 208.2; 403/408.1; 411/366, 303, 402

[56] References Cited

U.S. PATENT DOCUMENTS

| | | | |
|---|---|---|---|
| 248,975 | 11/1881 | Wootten | 411/303 |
| 953,681 | 4/1910 | Barber | 105/201 |
| 2,862,459 | 12/1958 | Miller et al. | 105/208.2 X |
| 3,670,660 | 6/1972 | Weber et al. | 105/201 X |
| 4,048,898 | 9/1977 | Salter | 411/339 X |
| 4,126,170 | 11/1978 | DeHaitre | 411/303 |
| 4,746,239 | 5/1988 | Marquardt | 403/408.1 X |
| 5,024,051 | 6/1991 | Glass et al. | 411/366 |

Primary Examiner—Robert J. Oberleitner
Assistant Examiner—S. Joseph Morano

[57] ABSTRACT

A connection is described for securing the ends of a transom to rocker seats which are each supported on a pair of rocker seat bearings that are designed to rest in u-shaped channels which are formed in the sideframes of a railroad car truck or bogie. The aligned holes in the overlapped transom ends and rocker seats are provided with oppositely tapered conical seats to matingly receive a conically shaped end of a nut which threadably engages the shaft of a bolt which has a conically shaped head which matingly fits in the conically tapered seat of the hole opposite the nut. A metal lock nut or an elastomeric locking ring can be provided to engage the nut and bolt to prevent them from loosening and eventually coming apart.

10 Claims, 1 Drawing Sheet

FASTENING DEVICE FOR A RAILROAD CAR TRUCK ROCKER SEAT

BACKGROUND OF THE INVENTION

The invention relates to railroad cars, especially the trucks or bogies which are located at opposing ends of a railroad car to support the car on the rails of a trackway. More particularly, the invention relates to a truck which is manufactured and sold by National Castings Incorporated of Lisle, Ill. under the trademark SWING MOTION. A detailed description of this quality truck with excellent high speed performance characteristics is found in U.S. Pat. No. 3,670,660. The SWING MOTION truck is manufactured from many different steel parts, such as a bolster and transom which are coupled transversely between a pair of parallel sideframes between which a pair of axles with attached wheels are mounted for rotation. The transom is generally parallel to the bolster, but in closer spaced relation to the trackway, when the truck is mounted on the trackway. The transom has a pair of opposing ends which are mounted on similar rocker seats that are supported on hardened steel, rocker seat bearings which are designed to rest in channel-shaped recesses that are formed in the sideframes below the connection of the bolster ends with the sideframes. Unfortunately, continued wear causes the connection between the transom and rocker seats to loosen which can adversely effect operation of the truck at high speeds. Such wear is accelerated, if the rails of the trackway are wavy or misaligned. The invention is directed to eliminating or substantially reducing this problem by the provision of a more rigid connection between the transom and the rocker seats.

Briefly stated, the invention comprises forming specially shaped holes in the transom ends and rocker seats to receive uniquely contoured nuts and bolts which are designed to hold the rocker seats firmly in compressive engagement with the overlapped ends of the transom, even after extended use of the truck produces excessive wear on the connections between the transom and rocker seats.

DESCRIPTION OF THE DRAWING

The following description of the invention will be better understood by having reference to the accompanying drawing, wherein.

DETAILED DESCRIPTION OF THE DRAWING

Figure 1:
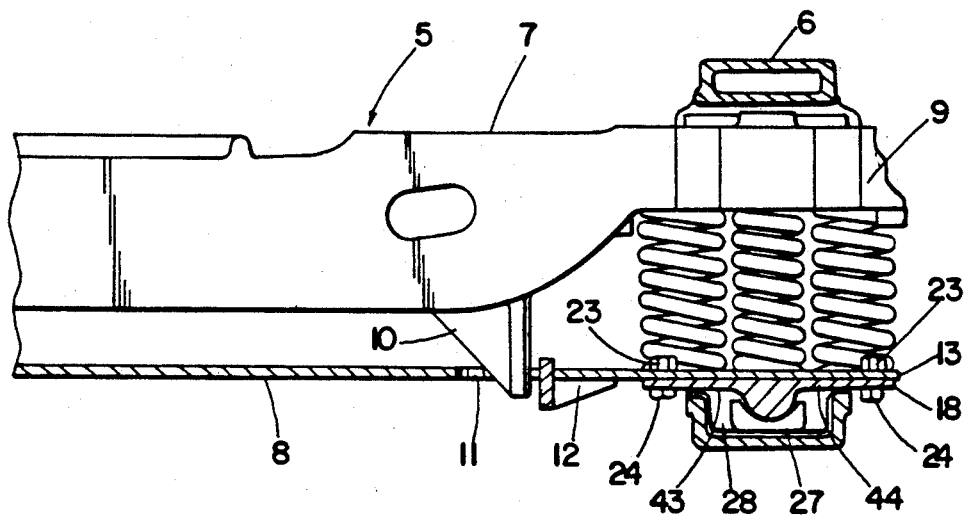
FIG. 1 is a side view of portions of a bolster and transom which are coupled to an adjacent wheelless sideframe, the transom and portions of the sideframe being shown, in section.

With general reference to the drawing for like parts, and specific reference to FIG. 1, there is shown a railroad car truck 5, which essentially comprises a pair of similar sideframes 6 between which are coupled a bolster 7 and a transom 8 which is generally parallel to the bolster 7 in closer spaced relation to the trackway on which the truck is mounted. Adjacent each end 9 of the bolster 7 is a stop 10 which projects from the bolster 7 through an adjacent slot 11 in the transom 7 which is provided with a pair of similar, spaced abutments 12 which are spaced outwardly of the stops 10 closer the sideframes 6 to engage the stops 10 to limit relative axial movement between the bolster 7 and the transom 8.

Figure 2:
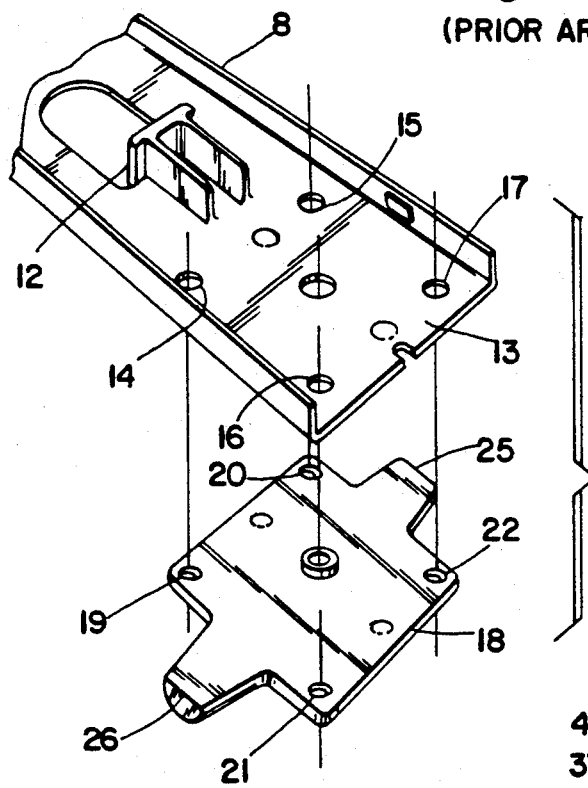
FIG. 2 is a perspective view of a bolster end and adjacent aligned rocker seat to more clearly show how the rocker seats are fastened to the transom.

The transom 8 has a pair of identical, opposing ends 13, each of which is provided with a plurality of strategically located bolt holes 14-17, as best seen in FIG. 2. The ends 13 of the transom 8 are each conventionally secured to a rocker seat 18 which also has the same number of bolt holes 19-22 which are aligned with the bolt holes 14-17 of an adjacent end 13 of the transom 8, when the end 13 is properly positioned in supported, overlapped relation on the rocker seat 18 for fastening the end 13 to the rocker seat 18 by means of regular nuts 23 and bolts 24, as best seen in FIG. 1. Each of the rocker seats 18 has a pair of opposing ends 25 and 26 which are supported on a pair of identical, rocker seat bearings 27 which are designed to rest in an adjacent u-shaped channel 28 which is formed in each of the sideframes 6.

Another well known method of connecting the rocker seats 18 to the ends 13 of the transom 8, is to replace the bolt holes 19-22 (FIG. 2) in the rocker seats 18 with solid, upstanding frustum-conically shaped dowels or studs (not shown) which are designed to project into the aligned holes 14-17 in the ends 13 of the transom 8. However, this type of connection relies mainly on friction to hold the two components together and is highly susceptible to wear and loosening of the connection. The rigidity of this particular connection can be highly improved by the provision of applicant's unique nut and bolt connection 29 (FIG. 3) in a pair of aligned bolt holes, shown in phantom, in each transom end 13 and adjacent rocker seat 18 midway between the holes 14,15 and 16,17 and projecting studs 19, 20 and 21, 22, respectively.

Figure 3:
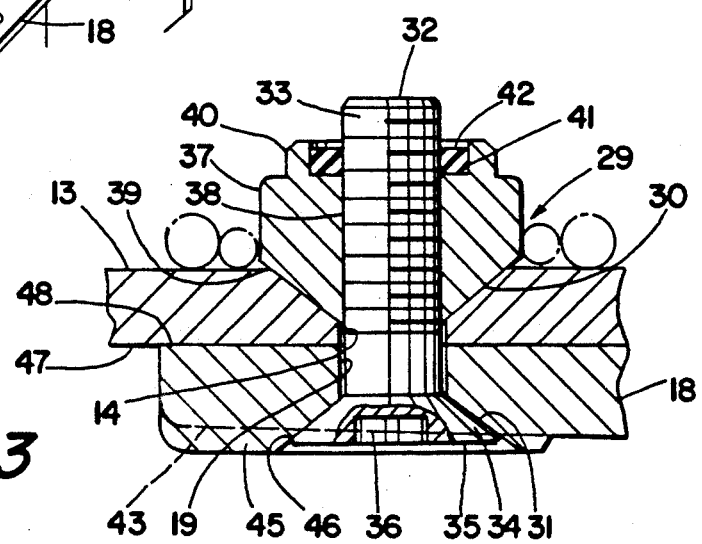
FIG. 3 is a section taken through one of the unique connections used in fastening a rocker seat to the transom.

With reference to FIG. 3, there is shown applicants unique connection 29 for joining the ends 13 of the transom 8 to the rocker seats 18. Any aligned bolt holes in an overlapped transom end 13 and rocker seat 18, e.g. bolt holes 14 and 19 in FIG. 2, are provided with oppositely tapered and spaced conical seats or sections 30 and 31, respectively. A bolt 32 of the invention, includes a threaded shaft 33 and a conical head 34, similar in design to a flat headed machine screw. The outer flat surface 35 of the bolt head 34 is provided with a suitably contoured recess 36 for receiving a conventional tool which can be used to rotate, or prevent rotation of the bolt 32 in the aligned bolt holes 14 and 19 of the transom 13 and rocker seat 18. The conical head 34 of the bolt 32 is matingly received and seated in the conical section 31 of the hole 19 of the rocker seat 18. A nut 37 of the invention has a center bore 38 which is threaded to engage the shaft 33 of the bolt 32. The nut 37 has a conically shaped end section 39 which is matingly received and seated in the conical section 30 of the hole 14 of the transom end 13. The nut 37 has an outer head 40 which, for example, is designed to be received in the jaws of a conventional wrench for tightening or loosening the nut 37 on the shaft 33 of the bolt 32. The outer head 40 of the nut 37 is provided with a cylindrical recess 41 for receiving any suitable elastomeric locking ring 42 which is forced onto the adjacent threaded tip of the bolt 32 into compressive engagement with the larger, main nut 37, after the main nut 37 is firmly tightened on the shaft 33 of the bolt 32 to bring the main nut 37 and bolt 32 into tight, compressive engagement with the transom 8 and rocker seat 18. The locking ring 42 prevents loosening of the tightened nut and bolt assembly. Alternately, a conventional threaded, metal lock nut can be used in place of the elastomeric locking ring 42.

If the rocker seat 18 has tapered or sloped undersides 43, 44 as seen in FIGS. 1 and 3, then an oppositely tapered shim 45 with a conically tapered bolt hole 46 should be used with each of the bolts 32 to insure that the longitudinal axis of any bolt 32 is normal to the planar abutting surfaces 47 and 48 of the transom 8 and rocker seat 18, respectively, to insure a tight fit between the nut 37 and bolt 32 and adjacent abutting surfaces of the transom 8 and rocker seat 18.

The tapered studs 19-22 of the rocker seats 18 in the aforementioned embodiment, are sized so that they can be used as retainers for the metal coil springs which are provided to dampen and prevent undesirable motion of the sideframes from being transmitted to the bolster and attached railroad car. The nuts 37 of applicant's connection 29 are similarly sized to match the studs 19-22, so that they can also be used as retainers of the metal coil springs, shown in phantom.

Thus, there has been described a unique connection between the ends of the transom and the rocker seats which are used to couple the transom between a pair of sideframes. The oppositely tapered, conical sections of the nut and head of the bolt exert a great deal of force against the matingly sloped or tapered seats in the holes in the rocker seats and ends of the transom, when the nut is properly tightened on the bolt. The invention has been described in relation to the use of four nuts and bolts for fastening the transom to each of the rocker seats. The overlapped joint between each end of the transom and an adjacent rocker seat requires only two unique connections when used in combination with the aforementioned tapered studs of a conventional rocker seat. The number of such unique connections used is dependent on the stress or force imposed on the joint between the transom and rocker seats. The aforementioned unique connection can also be used to secure other overlapped parts of a railroad car truck together.

What is claimed is:

1. A railroad car truck, comprising:
   a) a pair of sideframes;
   b) a bolster and transom coupled between the sideframes in spaced, generally parallel relation, the transom having a pair of opposing ends with a plurality of bolt holes which extend transversely through a flat end portion of the transom, the holes each having a conically tapered seat in closest spaced relation to the bolster, the tapered seats having walls which converge in a direction away from the bolster;
   c) a pair of rocker seats secured to the flat end portions of the transom in crosswise parallel relation, the end portions of the transom being in supported, overlapped, abutting relation on the rocker seats, each of which rocker seats has a plurality of bolt holes in axially aligned relation with the bolt holes in the adjacent overlapped end portion of the transom, each of the rocker seats having, i) a flat top surface abutting an adjacent said end portion of the transom, and ii) a pair of flat bottom surfaces which are in farthest spaced relation from the transom relative to the top surface and which intersect and diverge from each other in a direction towards the top surface, the bolt holes in the rocker seats each having a conically tapered seat in the bottom surfaces in oppositely tapered and spaced relation from the conical seat in an opposed aligned said bolt hole in the end portion of the transom;
   d) a wedge-shaped shim abutting each of the pair of bottom sides of the rocker seats and being counter tapered in relation thereto, such that a flat outer surface of each shim, farthest spaced from the adjacent rocker seat, parallels the top surface of the rocker seat, each of the shims having a conically tapered hole which is a conical continuation of an adjacent aligned said conical seat in the rocker seat;
   e) a bolt with a threaded shaft extending through each pair of aligned bolt holes, the bolt having a conically shaped head for mating reception and seating engagement in the conical seat in one of the pairs of aligned bolt holes, including an aligned said conically tapered hole in an associated said shim; and
   f) a separate nut for threadably engaging the shaft of each bolt, each nut having a conically shaped end for mating reception and seating engagement in the conical seat in the other bolt hole of the pair of aligned bolt holes.

2. The railroad car truck of claim 1, which includes:
   g) means coacting with each nut for locking the nut on the shaft of an adjacent said bolt, when the conically shaped end of the nut and the conically shaped head of the adjacent bolt are in compressive engagement with the conically tapered seats in the bolt holes.

3. The railroad car truck of claim 2, wherein the means for locking each nut in place includes a recess in each nut in farthest spaced relation from the head of the bolt to which the nut is threadably engaged, and a separate elastomeric locking ring disposed in the recess in compressive engagement with the adjacent nut and shaft of the bolt which extends into the recess.

4. The railroad car truck of claim 3, which includes means formed in each of the nuts for engaging a tool which can be used to rotate the nut on the bolt.

5. The railroad car truck of claim 4, wherein the head of each bolt is flat and includes a configured recess for receiving a tool which can be used to rotate the bolt.

6. The railroad car truck of claim 1, wherein each of the nuts are sized to retain a coil spring when one end of the coil spring is placed around the nut.

7. A railroad car truck, comprising:
   a) a pair of sideframes;
   b) a bolster and transom coupled between the sideframes in spaced, generally parallel relation, the transom having a pair of opposing ends with a plurality of bolt holes which extend transversely through the transom, the holes each having a conically tapered seat in closest spaced relation to the bolster, the tapered seats having walls which converge in a direction away from the bolster;
   c) a pair of rocker seats secured to the ends of the transom in crosswise parallel relation, the ends of the transom being in supported, overlapped relation on the rocker seats, each of which rocker seats has a plurality of bolt holes in axially aligned relation with the bolt holes in the adjacent overlapped end of the transom, the bolt holes in the rocker seats each having a conically tapered seat in oppositely tapered and spaced relation from the conical seat in an opposed aligned said bolt hole in the end of the transom;

d) a bolt with a threaded shaft extending through each pair of aligned bolt holes, the bolt having a conically shaped head for mating reception and seating engagement in the conical seat in one of the pairs of aligned bolt holes, the head of the bolt being flat and having therein a configured recess for receiving a toll which can be used to rotate the bolt;

e) a separate nut for threadably engaging the shaft of each bolt, each nut having a conically shaped end for mating reception and seating engagement in the conical seat in the other bolt hole of the pair of aligned bolt holes;

f) means coacting with each nut for locking the nut on the shaft of an adjacent said bolt, when the conically shaped end of the nut and the conically shaped head of the adjacent bolt are in compressive engagement with the conically tapered seats in the bolt holes, said nut locking means including, i) a recess in each nut in farthest spaced relation from the head of the bolt to which the nut is threadably engaged, and ii) a separate elastomeric locking ring disposed in the recess in compressive engagement with the nut and shaft of the bolt which extends into the recess;

g) means formed in each of the nuts for engaging a tool which can be used to rotate the nut on the bolt; and h) a wedge-shaped shim with a conically tapered hole which is designed to receive the conical head of the bolt.

8. A rigid connection between a rocker seat and an overlapped end of a transom of a railroad car truck, wherein the rocker seat has, i) a flat top side abutting the transom, and ii) a shallow, generally V-shaped bottom side which includes a pair of flat bottom sides which are spaced from the top side and transom and which intersect and diverge in a direction towards the top side, and the overlapped end of the transom has, iii) a bottom side abutting the top side of the rocker seat, and iiii) a top side which is parallel to the bottom side thereof, the rigid connection comprising:

a) a plurality of pairs of aligned holes extending transversely through the rocker seat and end of the transom, each pair of aligned holes having therein a pair of oppositely disposed conical seats at the top side of the transom end and bottom side of the rocker seat, each pair of opposed conical seats having a pair of conical walls which converge in a direction towards each other;

b) at least one wedge-shaped shim abutting at least one of the pair of flat bottom sides of the rocker seat, the at least one shim being oppositely tapered in relation to the taper of the abutting flat bottom side and having a flat, outer exposed surface which parallels the top side of the rocker seat, the at least one shim having a conically shaped hole in axial alignment with one of said pairs of aligned holes in the transom end and rocker seat, the conically shaped hole being an extension of the conical seat in the rocker seat;

c) a threaded bolt with a conically shaped flat head mounted in said one pair of aligned holes, including the conically shaped hole in the at least one shim, the conically shaped head of the bolt resting in one of the opposing pairs of conical seats; and d) a nut mounted in threaded engagement on the bolt, the nut having a conically tapered end for compressive engagement in the other of the opposing pairs of conical seats, when the nut is tightened on the bolt.

9. The rigid connection of claim 8, wherein the bolt has a free distal end in spaced relation from the head, and which includes a lock nut threadably mounted on the free distal end of the bolt in compressive engagement with the nut to prevent loosening of the nut on the bolt.

10. The rigid connection of claim 8, wherein the nut and bolt includes separate means for engaging a tool to rotate the nut and bolt independently of each other.

* * * * *